(12) United States Patent
Nakao et al.

(10) Patent No.: US 11,652,368 B2
(45) Date of Patent: May 16, 2023

(54) NON-CONTACT POWER SUPPLY DEVICE AND POWER TRANSMISSION DEVICE

(71) Applicant: OMRON Corporation, Kyoto (JP)

(72) Inventors: Goro Nakao, Inazawa (JP); Atsushi Nomura, Ichinomiya (JP); Yusuke Kawai, Ichinomiya (JP); Masanobu Nakajo, Nagoya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/416,710

(22) PCT Filed: Dec. 3, 2019

(86) PCT No.: PCT/JP2019/047247
§ 371 (c)(1),
(2) Date: Jun. 21, 2021

(87) PCT Pub. No.: WO2020/152999
PCT Pub. Date: Jul. 30, 2020

(65) Prior Publication Data
US 2022/0052558 A1    Feb. 17, 2022

(30) Foreign Application Priority Data

Jan. 23, 2019    (JP) .............................. JP2019-009596

(51) Int. Cl.
*H02J 50/12*    (2016.01)
*H02M 1/00*    (2006.01)
*H02M 3/335*    (2006.01)

(52) U.S. Cl.
CPC ........... *H02J 50/12* (2016.02); *H02M 1/0009* (2021.05); *H02M 1/0038* (2021.05); *H02M 3/33569* (2013.01)

(58) Field of Classification Search
CPC ................................. H02J 50/12; H02J 50/00
See application file for complete search history.

(56) References Cited

U.S. PATENT DOCUMENTS

| 2014/0159500 A1* | 6/2014 | Sankar | .................... H02J 50/10 |
| | | | 307/104 |
| 2014/0266018 A1* | 9/2014 | Carobolante | ......... H02J 50/402 |
| | | | 320/108 |

(Continued)

FOREIGN PATENT DOCUMENTS

| JP | 2018-99001 A | 6/2018 |
| WO | 2017/134870 A1 | 8/2017 |

OTHER PUBLICATIONS

Katsuhiro Hata et al., "Implementation and Experimental Validation of Control System for Ground Facilities and Electric Vehicles in Dynamic Wireless Power Transfer", 2017 Spring Meeting, pp. 2444-2449, The Society of Automotive Engineers of Japan, Inc., Japan ; Cited in the Specification.

(Continued)

*Primary Examiner* — Rexford N Barnie
*Assistant Examiner* — Joseph N Inge
(74) *Attorney, Agent, or Firm* — Metrolex IP Law Group, PLLC (57) ABSTRACT

A power transmission device includes a transmission coil that supplies power to a power reception device, a power supply circuit that converts DC power supplied from a DC power source via a plurality of switching elements connected in a full bridge shape or a half bridge shape between DC power sources and the transmission coil into AC power and supplies the AC power to the transmission coil, a phase adjustment circuit having an LC series circuit connected in parallel with the transmission coil and a switching element connected in series with the LC series circuit, and a control circuit that controls switching on and off of the switching element of the phase adjustment circuit in accordance with a measured value of an amount of current when any of the (Continued)

plurality of switching elements of the power supply circuit is turned off by a current detection circuit.

3 Claims, 4 Drawing Sheets

(56) References Cited

U.S. PATENT DOCUMENTS

| | | | |
|---|---|---|---|
| 2014/0285027 A1* | 9/2014 | Sakamoto | B60L 53/30 |
| | | | 307/104 |
| 2015/0194811 A1* | 7/2015 | Mao | H02M 3/33523 |
| | | | 307/104 |
| 2017/0222466 A1* | 8/2017 | Sankar | H02J 7/0029 |
| 2019/0027964 A1* | 1/2019 | Yabumoto | H02J 50/70 |
| 2019/0222064 A1* | 7/2019 | Du | H02H 3/08 |
| 2021/0091591 A1* | 3/2021 | Brelivet | H02J 50/12 |

OTHER PUBLICATIONS

English translation of the International Search Report ("ISR") of PCT/JP2019/047247 dated Mar. 3, 2020.
Written Opinion("WO") of PCT/JP2019/047247 dated Mar. 3, 2020.

* cited by examiner

NON-CONTACT POWER SUPPLY DEVICE AND POWER TRANSMISSION DEVICE

TECHNICAL FIELD

The invention relates to a non-contact power supply device and a power transmission device used in the non-contact power supply device.

BACKGROUND ART

Conventionally, there has been studied a so-called non-contact power feeding (also referred to as wireless power feeding) technique that transmits power through a space without a metal contact or the like interposed therebetween.

It has been studied to supply power to a moving object using such a non-contact power feeding technique (see, for example, Non-Patent Document 1). In a technique disclosed in Non-Patent Document 1, power is transmitted from a power transmission facility to an electric vehicle (EV) on a reception side in accordance with a so-called primary series secondary series capacitor system (SS system). At that time, the power transmission facility detects a vehicle by focusing on input impedance. That is, in a search mode, the power transmission facility applies a search pulse having the same frequency as a resonance frequency of a power transmitter and receiver to the power transmitter in each search cycle. Then, when the input impedance increases due to an approach of the power receiver, and as a result, a transmission-side current effective value does not reach a threshold value even after the search pulse is applied to the power transmitter and a certain period of time elapses, a mode shifts to a power transmission mode. On the other hand, until the EV enters the power transmitter, the EV is in a standby mode and stands by with a semiconductor switch of a half active rectifier (HAF) turned on and the power receiver short-circuited. Then, upon detection that power is received from the power transmission facility, the EV shifts to a charge mode, turns off the semiconductor switch of the HAF, and operates the HAF similarly to a diode rectifier circuit to receive energy.

PRIOR ART DOCUMENT

Non-Patent Document

Non-Patent Document 1: Hata et al., "Implementation and Experimental Validation of Control System for Ground Facilities and Electric Vehicles in Dynamic Wireless Power Transfer", The Society of Automotive Engineers of Japan, Inc., 2017 Spring Meeting, pp. 2444-2449, 2017

SUMMARY

However, the above technique needs control for switching between a case where power transmission is performed and a case where power transmission is not performed on each of a transmission side and a reception side, and this complicates the entire control. In addition, it may be difficult to short-circuit the power receiver for some application of use.

A non-contact power supply device according to one or more embodiments may be capable of suppressing energy consumption when power transmission is stopped by simple control.

A non-contact power supply device according to one or more embodiments may include a power transmission device and a power reception device in which power is transmitted from the power transmission device in a non-contact manner. The power transmission device includes a transmission coil configured to supply power to the power reception device, a power supply circuit including a plurality of switching elements connected in a full bridge shape or a half bridge shape between a DC power source and the transmission coil, and configured to convert DC power supplied from the DC power source into AC power having a switching frequency by switching on and off the plurality of switching elements at the switching frequency and supply the AC power to the transmission coil, a phase adjustment circuit including an LC series circuit connected in parallel with the transmission coil and a switching element connected in series with the LC series circuit, a current detection circuit configured to obtain a measured value of an amount of current flowing through the plurality of switching elements of the power supply circuit, and a control circuit configured to control switching on and off of the switching element of the phase adjustment circuit in accordance with a measured value of the amount of current when any of the plurality of switching elements of the power supply circuit is turned off. With the above described configuration, the non-contact power supply device may suppress energy consumption when power transmission is stopped by simple control.

In this non-contact power supply device, it may be preferable that a control circuit turns off the switching element of the phase adjustment circuit when the measured value of the amount of current becomes equal to or less than a first threshold value in a case where the switching element of the phase adjustment circuit is turned on, and it may be preferable that the control circuit turns on the switching element of the phase adjustment circuit when the measured value of the amount of current becomes higher than a second threshold value that is larger than the first threshold value in a case where the switching element of the phase adjustment circuit is turned off. With the above described configuration, the non-contact power supply device may reduce a switching loss in the plurality of switching elements of the power supply circuit while power transmission is stopped, and may cause the plurality of switching elements of the power supply circuit to perform a soft switching operation during the power transmission.

It may be preferable that the power supply circuit is may be configured to adjust a voltage applied to the plurality of switching elements, the control circuit may control the power supply circuit such that the voltage applied to the plurality of switching elements increases when the measured value of the amount of current becomes equal to or less than the first threshold value in a case where the switching element of the phase adjustment circuit is turned on, and the control circuit may control the power supply circuit such that the voltage applied to the plurality of switching elements decreases when the measured value of the amount of current becomes higher than the second threshold value in a case where the switching element of the phase adjustment circuit is turned off. With the above described configuration, a non-contact power supply device may reduce conduction loss in the plurality of switching elements of the power supply circuit and suppress energy consumption while power transmission is stopped, and may improve transmission efficiency when power transmission is performed.

A power transmission device according to one or more embodiments may transmit power to a power reception device in a non-contact manner. A power transmission device may include a transmission coil configured to supply power to the power reception device, a power supply circuit including a plurality of switching elements connected in a full bridge shape or a half bridge shape between a DC power source and the transmission coil, and may be configured to convert DC power supplied from the DC power supply into AC power having a switching frequency by switching on and off the plurality of switching elements at the switching frequency and supply the AC power to the transmission coil, a phase adjustment circuit including an LC series circuit connected in parallel with the transmission coil and a switching element connected in series with the LC series circuit, a current detection circuit configured to obtain a measured value of an amount of current flowing through the plurality of switching elements of the power supply circuit, and a control circuit configured to control switching on and off of the switching element of the phase adjustment circuit in accordance with a measured value of the amount of current when any of the plurality of switching elements of the power supply circuit is turned off. With the above described configuration, a power transmission device may suppress energy consumption when power transmission is stopped by simple control.

BRIEF DESCRIPTION OF THE DRAWINGS

FIG. 3A is a diagram illustrating an example of a simulation result of a waveform of a current flowing through a switching element of a power supply circuit in a case where a phase adjustment circuit is turned on.

FIG. 3B is a diagram illustrating an example of a simulation result of a waveform of a current flowing through a switching element of a power supply circuit in a case where a phase adjustment circuit is turned on.

Hereinafter, a non-contact power supply device according to one embodiment of the invention will be described with reference to the drawings.

The non-contact power supply device of the invention has a phase adjustment circuit including an LC series circuit connected in parallel with a power transmitting coil (hereinafter, referred to as a transmission coil) of a power transmission-side device (hereinafter, simply referred to as a power transmission device). Then, in the non-contact power supply device, in a case where a power reception-side device (hereinafter, simply referred to as a power reception device) is away from the power transmission device to so as not to be able to receive power, or in a case where a current flowing through a load circuit connected to the power reception device is small, the phase adjustment circuit is turned on, and the LC series circuit is connected to a power supply circuit. On the other hand, in a case where the power reception device is so close to the power transmission device to be able to receive the power, and the current flowing through the load circuit increases to some extent or more, in the power transmission device, the phase adjustment circuit is turned off, and the LC series circuit is disconnected from the power supply circuit. As a result, the non-contact power supply device controls a delay amount of the phase of the current flowing through each switching element of the power supply circuit from the phase of a voltage applied to each switching element of the power supply circuit that supplies AC power to the transmission coil and reduces a switching loss of the power supply circuit. Further, the power transmission device reduces a voltage applied from the power supply circuit to the transmission coil while the phase adjustment circuit is turned on to reduce a conduction loss caused by each switching element of the power supply circuit. Furthermore, in the non-contact power supply device, the power transmission device switches on and off the phase adjustment circuit on the basis of a peak value of the current flowing through each switching element of the power supply circuit when each switching element is turned off. Thus, in the non-contact power supply device, the power reception device does not need to control switching between time of power transmission and the other times, and it is therefore possible to energy consumption can be suppressed when power transmission is stopped by simple control.

Figure 1:
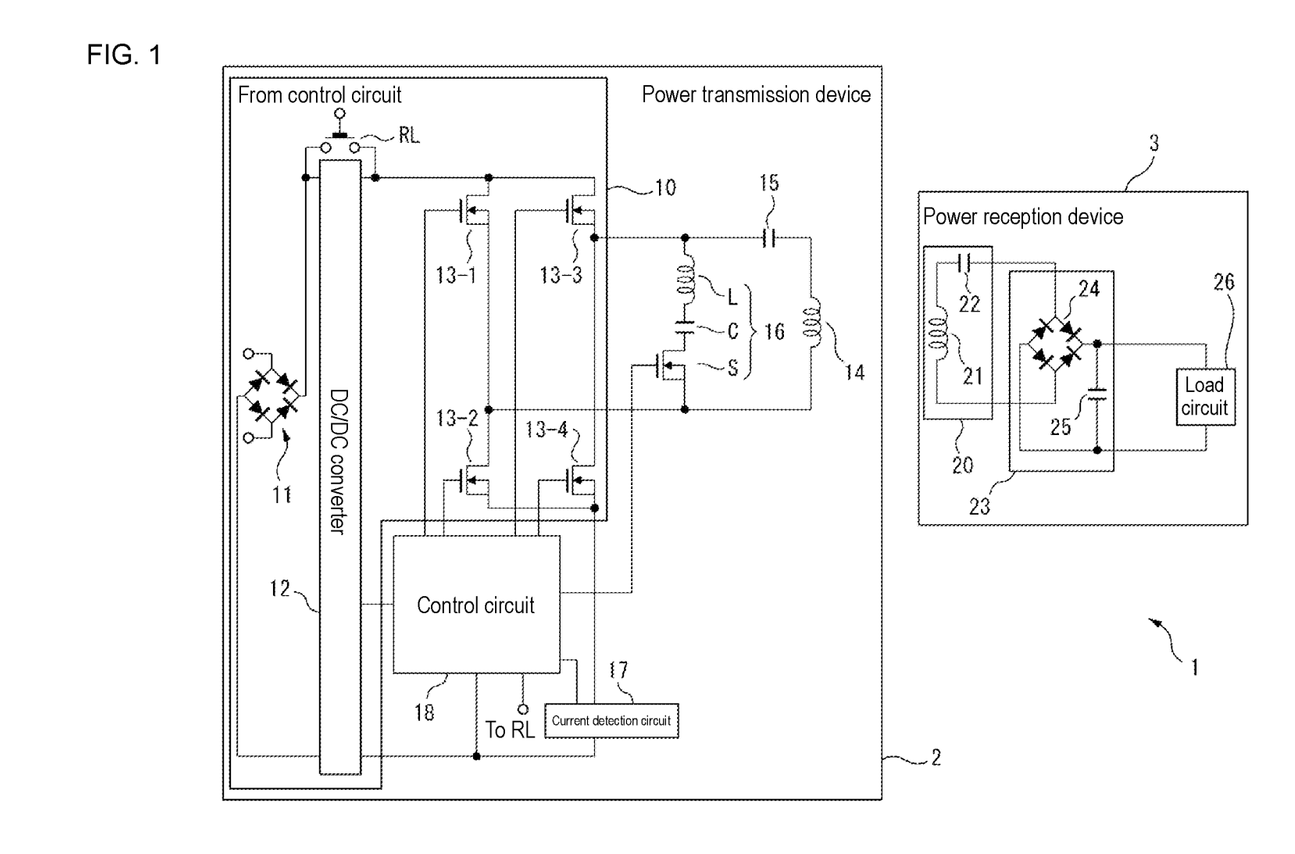
FIG. 1 is a schematic configuration diagram illustrating a non-contact power supply device including a power transmission device according to one or more embodiments.

FIG. 1 is a schematic configuration diagram of the non-contact power supply device including the power transmission device according to one embodiment of the invention. As illustrated in FIG. 1, a non-contact power supply device 1 includes a power transmission device 2 and a power reception device 3 that transmits power from the power transmission device 2 via a space in a non-contact manner. The power transmission device 2 includes a power supply circuit 10, a transmission coil 14, a capacitor 15, a phase adjustment circuit 16, a current detection circuit 17, and a control circuit 18. Meanwhile, the power reception device 3 has a resonance circuit 20 including a reception coil 21 and a resonance capacitor 22, a rectifying and smoothing circuit 23, and a load circuit 26.

First, the power transmission device 2 will be described.

The power supply circuit 10 supplies AC power having a predetermined switching frequency and an adjustable voltage to the transmission coil 14. For this purpose, the power supply circuit 10 has a power source 11, a DC/DC converter 12, a relay RL, and four switching elements 13-1 to 13-4.

The power source 11 supplies DC power. For this purpose, the power source 11 is connected to, for example, a commercial AC power source, and has a full-wave rectifier circuit for rectifying AC power supplied from the AC power source, and a smoothing capacitor for smoothing pulsating power outputted from the full-wave rectifier circuit. Then, the power source 11 outputs DC power having a voltage corresponding to the voltage of the AC power applied to the transmission coil 14 when power is transmitted from the power transmission device 2 to the power reception device 3.

The DC/DC converter 12 converts the voltage of the DC power outputted from the power source 11 into a lower voltage. Therefore, the DC/DC converter 12 can be any step-down DC/DC converter. Note that the power source 11 and the DC/DC converter 12 constitute a DC power source.

The relay RL is connected in parallel to the DC/DC converter 12 with respect to a positive electrode-side terminal of the power source 11. Then, the relay RL is switched on and off in accordance with control from the control circuit 18. In the embodiment, when power is transmitted from the power transmission device 2 to the power reception device 3, the relay RL is turned on, and the power outputted from the power source 11 bypasses the DC/DC converter 12 and is supplied to the four switching elements 13-1 to 13-4. On the contrary, in a case where power is not transmitted from the power transmission device 2 to the power reception device 3, that is, when the power reception device 3 is away from the power transmission device 2 so as not to be able to receive power, or in a case where the current flowing through the load circuit 26 of the power reception device 3 is small, the relay RL is turned off. Then, the power outputted from the power source 11 is supplied to the four switching elements 13-1 to 13-4 via the DC/DC converter 12. As a result, when power is not transmitted, the voltage of the AC power applied to the transmission coil 14 is lower than the voltage of the AC power applied to the transmission coil 14 during power transmission.

The four switching elements 13-1 to 13-4 can be n-channel MOSFETs, for example. In the embodiment, the four switching elements 13-1 to 13-4 are connected in a full bridge state between the power source 11 and the DC/DC converter 12 and the transmission coil 14 to constitute a full-bridge inverter circuit. That is, among the four switching elements 13-1 to 13-4, the switching element 13-1 and the switching element 13-2 are connected in series between the positive electrode-side terminal and the negative electrode-side terminal of the power source 11 via the DC/DC converter 12. In the embodiment, the switching element 13-1 is connected to a positive electrode side of the power source 11, and the switching element 13-2 is connected to a negative electrode side of the power source 11. A drain terminal of the switching element 13-1 is connected to a positive electrode-side terminal of the power source 11 via the DC/DC converter 12, and a source terminal of the switching element 13-1 is connected to a drain terminal of the switching element 13-2. A source terminal of the switching element 13-2 is connected to a negative electrode-side terminal of the power source 11 via the DC/DC converter 12. Further, the source terminal of the switching element 13-1 and the drain terminal of the switching element 13-2 are connected to one end of the transmission coil 14, and the source terminal of the switching element 13-2 is connected to the other end of the transmission coil 14 via the switching element 13-4 and the capacitor 15.

Similarly, among the four switching elements 13-1 to 13-4, the switching element 13-3 and the switching element 13-4 are connected in parallel with the switching element 13-1 and the switching element 13-2 and in series between the positive electrode-side terminal and the negative electrode-side terminal of the power source 11 via the DC/DC converter 12. Further, the switching element 13-3 is connected to the positive electrode side of the power source 11, and the switching element 13-4 is connected to the negative electrode side of the power source 11. A drain terminal of the switching element 13-3 is connected to the positive electrode-side terminal of the power source 11 via the DC/DC converter 12, and a source terminal of the switching element 13-3 is connected to a drain terminal of the switching element 13-4. A source terminal of the switching element 13-4 is connected to the negative electrode-side terminal of the power source 11 via the DC/DC converter 12. Further, the source terminal of the switching element 13-3 and the drain terminal of the switching element 13-4 are connected to the other end of the transmission coil 14 via the capacitor 15.

Gate terminals of the switching elements 13-1 to 13-4 are connected to the control circuit 18. Furthermore, the gate terminals of the switching elements 13-1 to 13-4 may be each connected to the source terminal of the own switching element via a resistor in order to ensure that the switching element is turned on when a voltage to turn on the switching element is applied. The switching elements 13-1 to 13-4 are switched on and off at a predetermined switching frequency in accordance with a control signal from the control circuit 18. In the embodiment, a pair of the switching element 13-1 and the switching element 13-4 and a pair of the switching element 13-2 and the switching element 13-3 are alternately switched on and off. That is, while the switching element 13-1 and the switching element 13-4 are turned on, the switching element 13-2 and the switching element 13-3 are turned off. Conversely, while the switching element 13-2 and the switching element 13-3 are turned on, the switching element 13-1 and the switching element 13-4 are turned off. As a result, the DC power supplied from the power source 11 via the DC/DC converter 12 is converted into AC power having the switching frequency of each switching element and supplied to the transmission coil 14.

Then, the transmission coil 14 transmits the AC power supplied from the power supply circuit 10 to the resonance circuit 20 of the power reception device 3 via the space.

The capacitor 15 is connected in series with the transmission coil 14 and cuts off a direct current flowing through the transmission coil 14. In the embodiment, the capacitor 15 is connected between one end of the transmission coil 14 and the source terminal of the switching element 13-3 and the drain terminal of the switching element 13-4. A capacitance of the capacitor 15 is preferably set such that a resonance frequency of the resonance circuit formed by the transmission coil 14 and the capacitor 15 is different from the switching frequency of the AC power supplied from the power supply circuit 10 to the transmission coil 14. That is, the capacitance of the capacitor 15 is preferably set such that the resonance circuit formed by the transmission coil 14 and the capacitor 15 does not resonate with the AC power supplied from the power supply circuit 10 to the transmission coil 14. The capacitor 15 may be omitted.

The phase adjustment circuit 16 adjusts the delay amount of the phase of the current flowing through each switching element of the power supply circuit 10 from the phase of the voltage applied to each switching element of the power supply circuit 10. For this purpose, the phase adjustment circuit 16 has an LC series circuit connected in parallel with the transmission coil 14 and including a coil L and a capacitor C connected in series with the coil L, and a switching element S such as a MOSFET connected in series with the LC series circuit. The switching element S is controlled to be switched on and off by the control circuit 18. When the switching element S is turned on (that is, when the phase adjustment circuit 16 is turned on), the LC series circuit is connected to the power supply circuit 10. Therefore, an amount of current flowing through each switching element of the power supply circuit 10 is a sum of an amount of current flowing through the LC series circuit and an amount of current flowing through the transmission coil 14. Therefore, the delay amount of the phase of the current flowing through each switching element of the power supply circuit 10 from the phase of the voltage applied to each switching element of the power supply circuit 10 depends on the phase of the sum of the amounts of current. On the other hand, when the switching element S is turned off (that is, when the phase adjustment circuit 16 is turned off), the LC series circuit is disconnected from the power supply circuit 10. Thus, the delay amount of the phase of the current flowing through each switching element of the power supply circuit 10 from the phase of the voltage applied to each switching element of the power supply circuit 10 depends on the phase of the current itself flowing through the transmission coil 14. Therefore, by switching on and off the phase adjustment circuit 16, the delay amount of the phase of the current flowing through each switching element of the power supply circuit 10 from the phase of the voltage applied to each switching element of the power supply circuit 10 is controlled.

In the embodiment, in a case where a coupling degree between the transmission coil 14 and the reception coil 21 is low, for example, in a case where the power reception device 3 is away from the power transmission device 2 so as not to be able to receive power, the phase of the current flowing through the transmission coil 14 is delayed from the phase of the voltage applied to each switching element of the power supply circuit 10. The same applies to a case where the current flowing through the load circuit 26 of the power reception device 3 is small. Thus, inductance of the coil L and a capacitance of the capacitor C included in the LC series circuit are preferably set such that the phase of the current flowing through the LC series circuit advances more than the phase of the voltage applied to each switching element of the power supply circuit 10. Therefore, the inductance of the coil L and the capacitance of the capacitor C are preferably set such that the resonance frequency of the LC series circuit is higher than the switching frequency of the AC power applied to the transmission coil 14.

The inductance of the coil L is preferably as large as possible. This is because the current flowing through the phase adjustment circuit 16 decreases as the inductance of the coil L increases. For example, the inductance of the coil L is preferably set such that the current flowing through the phase adjustment circuit 16 is smaller than an excitation current component that does not depend on a load of the load circuit 26 connected to the resonance circuit 20 in the current flowing through the transmission coil 14. That is, the inductance of the coil L is preferably larger than a value obtained by multiplying a maximum value kmax of an assumed coupling degree by a self-inductance on the transmission side when the transmission coil 14 and the reception coil 21 are electromagnetically coupled.

The current detection circuit 17 measures an amount of current flowing through the switching elements 13-1 to 13-4 included in the power supply circuit 10. The current detection circuit 17 can be any of various known current detection circuits capable of measuring a direct current, for example. In the embodiment, the current detection circuit 17 is connected between the source terminal of the switching element 13-2 and the source terminal of the switching element 13-4 and the negative electrode-side terminal of the power source 11. While the non-contact power supply device 1 is transmitting power, the current detection circuit 17 measures the amount of current flowing through the switching elements 13-1 to 13-4 and outputs a signal representing the measured amount of current to the control circuit 18.

The control circuit 18 has, for example, a nonvolatile memory circuit and a volatile memory circuit, an arithmetic circuit, an interface circuit for connection to another circuit, and a drive circuit for outputting a control signal to each switching element. Then, the control circuit 18 controls the switching elements 13-1 to 13-4 of the power supply circuit 10 such that the frequency of the AC power supplied from the power supply circuit 10 to the transmission coil 14 becomes a predetermined switching frequency. Note that the predetermined switching frequency can be a frequency at which the resonance circuit 20 of the power reception device 3 resonates at an assumed coupling degree between the transmission coil 14 and the reception coil 21.

Therefore, in the embodiment, the control circuit 18 alternately turns on a pair of the switching element 13-1 and the switching element 13-4 and a pair of the switching element 13-2 and the switching element 13-3. Further, the control circuit 18 equalizes a period in which the pair of the switching element 13-1 and the switching element 13-4 is turned on and a period in which the pair of the switching element 13-2 and the switching element 13-3 is turned on within one cycle corresponding to the switching frequency. It is preferable that the control circuit 18 prevents the pair of the switching element 13-1 and the switching element 13-4 and the pair of the switching element 13-2 and the switching element 13-3 from being simultaneously turned on and short-circuiting the power source 11. Therefore, when the control circuit 18 switches on and off the pair of the switching element 13-1 and the switching element 13-4 and the pair of the switching element 13-2 and the switching element 13-3, a dead time in which both pairs of the switching elements are turned off may be provided.

Further, the control circuit 18 controls switching on and off of the phase adjustment circuit 16, that is, switching on and off of the switching element S of the phase adjustment circuit 16 in accordance with the amount of current detected by the current detection circuit 17, and controls the voltage of the AC power supplied from the power supply circuit 10 to the transmission coil 14.

Note that details of switching on and off of the phase adjustment circuit 16 and control of the voltage applied to the transmission coil 14 by the control circuit 18 will be described later.

Next, the power reception device 3 will be described.

The resonance circuit 20 is an LC resonance circuit in which the reception coil 21 and the resonance capacitor 22 are connected in series. One end of the reception coil 21 included in the resonance circuit 20 is connected to one input terminal of the rectifying and smoothing circuit 23 via the resonance capacitor 22. The other end of the reception coil 21 is connected to the other input terminal of the rectifying and smoothing circuit 23.

The reception coil 21 receives power from the transmission coil 14 by resonating with an alternating current flowing through the transmission coil 14 of the power transmission device 2. Then, the reception coil 21 outputs the received power to the rectifying and smoothing circuit 23 via the resonance capacitor 22. Note that the number of windings of the reception coil 21 and the number of windings of the transmission coil 14 of the power transmission device 2 may be the same or different.

The resonance capacitor 22 has one end connected to one end of the reception coil 21 and the other end connected to the rectifying and smoothing circuit 23. The resonance capacitor 22 receives power by resonating with the current flowing through the transmission coil 14 together with the reception coil 21, and outputs the received power to the rectifying and smoothing circuit 23.

The rectifying and smoothing circuit 23 is an example of a rectifier circuit, includes a full-wave rectifier circuit 24 having four bridge-connected diodes and a smoothing capacitor 25, rectifies and smooths the power outputted from the resonance circuit 20, and converts the power into DC power. The rectifying and smoothing circuit 23 outputs the DC power to the load circuit 26.

Hereinafter, the operation of the non-contact power supply device 1 will be described in detail.

In the embodiment, the control circuit 18 of the power transmission device 2 controls turning on and off of the switching element S of the phase adjustment circuit 16 on the basis of the amount of current detected by the current detection circuit 17. Thus, the control circuit 18 controls the delay amount of the phase of the current flowing through the switching elements 13-1 to 13-4 from the phase of the voltage applied to the switching elements 13-1 to 13-4 to reduce a switching loss of the switching elements 13-1 to 13-4 of the power supply circuit 10.

As described above, when the phase adjustment circuit 16 is turned on, the amount of current flowing through the switching elements 13-1 to 13-4 is the sum of the amount of current flowing through the transmission coil 14 and the amount of current flowing through the phase adjustment circuit 16. When the resonance frequency of the LC series circuit of the phase adjustment circuit 16 is higher than the switching frequency of the AC power supplied to the transmission coil 14, the phase of the current flowing through the phase adjustment circuit 16 advances more than the phase of the voltage applied to the switching elements 13-1 to 13-4. On the other hand, the phase of the current flowing through the transmission coil 14 is delayed from the phase of the voltage applied to the switching elements 13-1 to 13-4. Therefore, in the switching elements 13-1 to 13-4, the current flowing through the transmission coil 14 and the current flowing through the phase adjustment circuit 16 cancel each other, and as a result, an effective value of the current flowing through the switching elements 13-1 to 13-4 also decreases.

However, the phase of the current flowing through the phase adjustment circuit 16 is substantially constant regardless of the coupling degree between the transmission coil 14 and the reception coil 21 and a change in the current flowing through the load circuit 26 of the power reception device 3. On the other hand, the phase of the current flowing through the transmission coil 14 changes in accordance with the coupling degree between the transmission coil 14 and the reception coil 21 and the current flowing through the load circuit 26 of the power reception device 3. Specifically, as the coupling degree between the transmission coil 14 and the reception coil 21 decreases, or as the current flowing through the load circuit 26 decreases, the delay of the phase of the current flowing through the transmission coil 14 from the phase of the voltage applied to the switching elements 13-1 to 13-4 increases. As a result, a peak value of the current flowing through the transmission coil 14 when the switching elements 13-1 to 13-4 are switched off from on (that is, when turned off) changes in accordance with the coupling degree between the transmission coil 14 and the reception coil 21 and the current flowing through the load circuit 26 of the power reception device 3.

Figure 2:
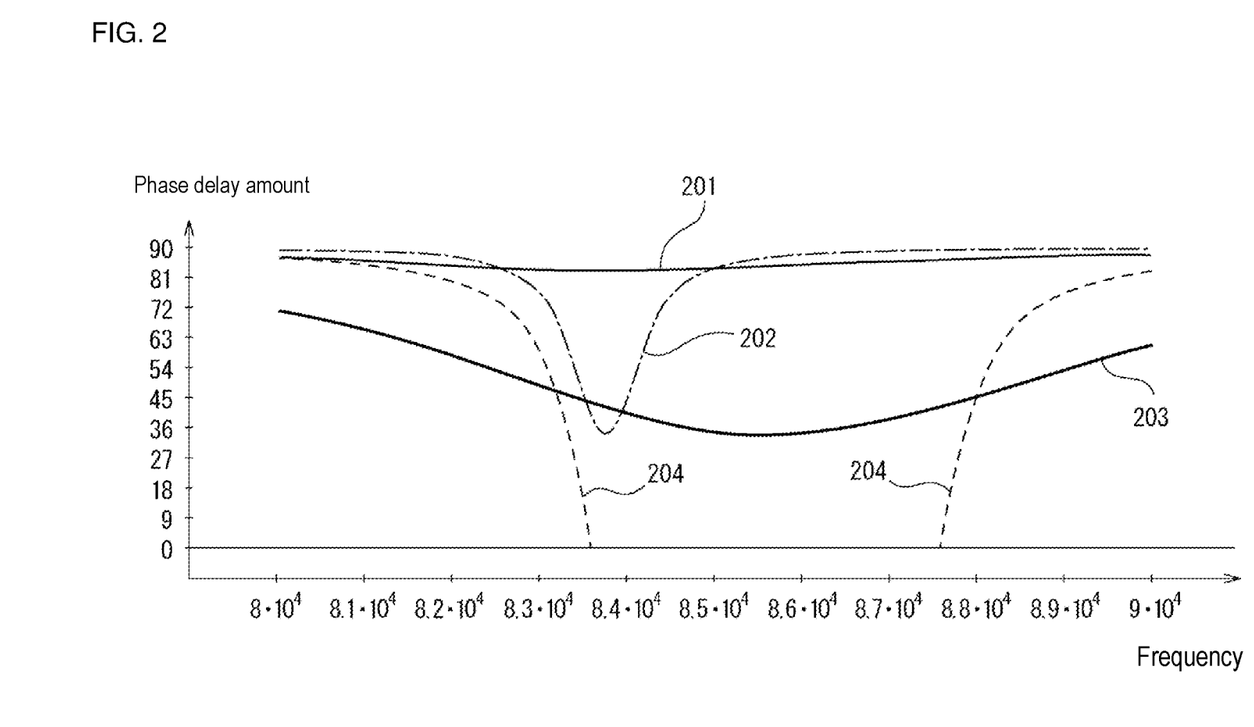
FIG. 2 is a diagram illustrating an example of a relationship between a coupling degree between a transmission coil and a reception coil and a current flowing through a load circuit and frequency characteristics of a phase delay amount of a current flowing through a transmission coil.

FIG. 2 is a diagram illustrating an example of a relationship between the coupling degree between the transmission coil 14 and the reception coil 21 and the current flowing through the load circuit 26 and frequency characteristics of a phase delay amount of the current flowing through the transmission coil 14. In FIG. 2, a horizontal axis represents a frequency, and a vertical axis represents the delay amount (hereinafter, simply referred to as a phase delay amount) of the phase of the current flowing through the transmission coil 14 from the phase of the voltage applied to the switching elements 13-1 to 13-4. Note that a negative value of the phase delay amount indicates that the phase of the current flowing through the transmission coil 14 advances more than the phase of the voltage applied to the switching elements 13-1 to 13-4.

A graph 201 represents frequency characteristics of the phase delay amount when a coupling degree k between the transmission coil 14 and the reception coil 21 is 0.1 and a resistance value Ro of the load circuit 26 is 10Ω. A graph 202 represents frequency characteristics of the phase delay amount when the coupling degree k is 0.1 and the resistance value Ro is 1Ω. Further, a graph 203 represents frequency characteristics of the phase delay amount when the coupling degree k is 0.3 and the resistance value Ro is 10Ω. A graph 204 represents frequency characteristics of the phase delay amount when the coupling degree k is 0.3 and the resistance value Ro is 1Ω. In this simulation, the inductance of the transmission coil 14 and the reception coil 21 is set to 220 μH, the capacitance of the capacitor 15 is set to 440 nF, the capacitance of the resonance capacitor 22 is set to 16.5 nF, and a winding resistance value of the transmission coil 14 and a winding resistance value of the reception coil 21 are set to 100 mΩ. Further, the inductance of the coil L of the phase adjustment circuit 16 is set to 220 μH, and the capacitance of the capacitor C is set to 9 nF.

In the embodiment, as illustrated in a comparison result between the graph 201 and the graph 203 and a comparison result between the graph 202 and the graph 204, the smaller the coupling degree k between the transmission coil 14 and the reception coil 21, the larger the phase delay amount. As indicated by a comparison result between the graph 201 and the graph 202 and a comparison result between the graph 203 and the graph 204, the larger the resistance value Ro of the load circuit 26, that is, the smaller the current flowing through the load circuit 26, the larger the phase delay amount in a frequency band in which the resonance circuit 20 resonates. Therefore, as the coupling degree k increases, the peak value of the current flowing through each switching element when the switching elements 13-1 to 13-4 are turned off decreases. Similarly, as the current flowing through the load circuit 26 increases, the peak value of the current flowing through each switching element when the switching elements 13-1 to 13-4 are turned off decreases. Further, as illustrated in the graph 204, when the coupling degree k is large to some extent and the resistance value Ro of the load circuit 26 is small, depending on the frequency, the phase of the current flowing through the transmission coil 14 advances more than the phase of the voltage applied to the switching elements 13-1 to 13-4.

Figure 3A:
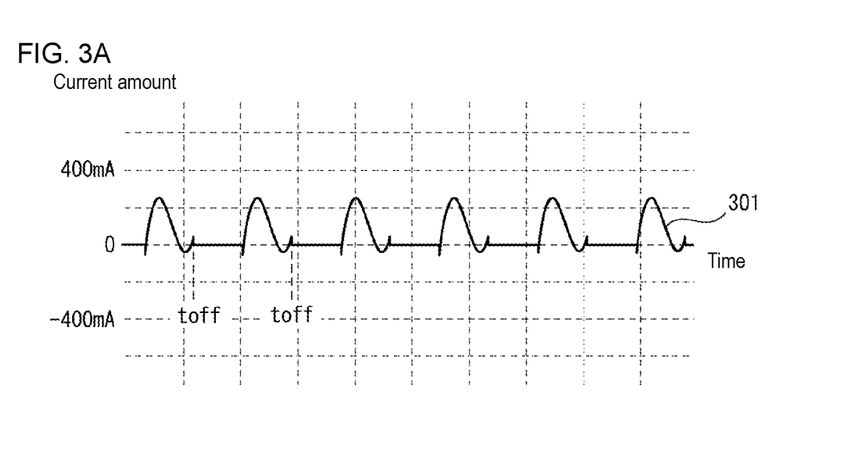
Figure 3B:
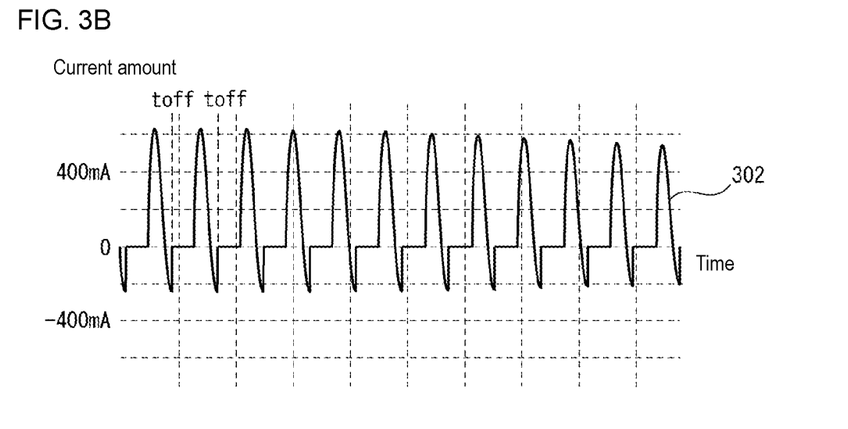
Figure 3C:
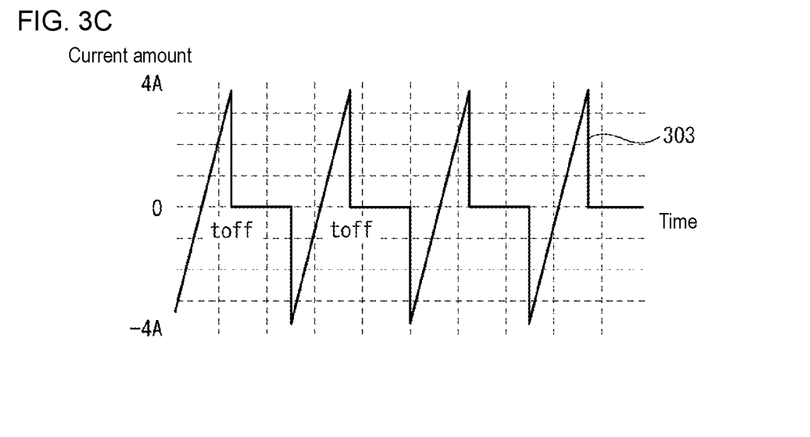
FIG. 3C is a diagram illustrating an example of a simulation result of a waveform of a current flowing through a switching element of a power supply circuit in a case where a phase adjustment circuit is turned off.

FIGS. 3A and 3B are diagrams each illustrating an example of a simulation result of a waveform of current flowing through any of the switching elements 13-1 to 13-4 in a case where the phase adjustment circuit 16 is turned on. FIG. 3C is a diagram illustrating an example of a simulation result of the waveform of the current flowing through any of the switching elements 13-1 to 13-4 in a case where the phase adjustment circuit 16 is turned off. In each of FIGS. 3A to 3C, the horizontal axis represents time, and the vertical axis represents the amount of current. In this simulation, the resistance value Ro of the load circuit 26 is set to 8Ω, the switching frequency of the AC power applied to the transmission coil 14 is set to 84.5 kHz, and the voltage of the AC power is set to 27 V. In FIGS. 3A and 3C, the coupling degree k between the transmission coil 14 and the reception coil 21 is set to 0, and in FIG. 3B, the coupling degree k between the transmission coil 14 and the reception coil 21 is set to 0.2. The other parameters are set to the same values as those in the simulation of FIG. 2.

A waveform 301 illustrated in FIG. 3A is a waveform of a current when the coupling degree k between the transmission coil 14 and the reception coil 21 is 0 in a case where the phase adjustment circuit 16 is turned on, and a waveform 302 illustrated in FIG. 3B is a waveform of a current when the coupling degree k is 0.2 in a case where the phase adjustment circuit 16 is turned on. Further, a waveform 303 illustrated in FIG. 3C is a waveform of a current when the coupling degree k between the transmission coil 14 and the reception coil 21 is 0 in a case where the phase adjustment circuit 16 is turned off. The waveform of the current when the current flowing through the load circuit 26 becomes 0 (for example, when the load circuit 26 is a secondary battery, and the secondary battery is almost fully charged) is also similar to the waveform 303. In FIGS. 3A to 3C, a turn-off time toff is a timing when a pair of switching elements simultaneously turned on among the switching elements 13-1 to 13-4 of the power supply circuit 10 is turned off. Comparing the waveform 301 illustrated in FIG. 3A with the waveform 302 illustrated in FIG. 3B, it can be seen that the peak value of the current at the turn-off time toff decreases as the coupling degree k increases. As illustrated in FIG. 3B, in some cases, the peak value of the current at the turn-off time toff is negative. Furthermore, comparing the waveform 301 illustrated in FIG. 3A with the waveform 303 illustrated in FIG. 3C, it can be seen that the peak value of the current at the turn-off time toff is suppressed to be low by turning on the phase adjustment circuit 16 even in a case where the coupling degree k is 0, that is, even in a case where the power reception device 3 is away from the power transmission device 2 so as not to receive power, and as a result, the switching loss is reduced.

In order to improve energy transmission efficiency, the switching elements 13-1 to 13-4 of the power supply circuit 10 of the power transmission device 2 preferably perform a soft switching (inductive) operation continuously. In order for the switching elements 13-1 to 13-4 to perform the soft switching operation, the phase of the current flowing through the switching elements 13-1 to 13-4 is preferably delayed from the phase of the voltage applied to the switching elements 13-1 to 13-4. Thus, for example, when the switching element 13-1 and the switching element 13-4 are turned on, a current flows from the source terminal to the drain terminal of the switching element 13-1, and therefore the switching elements 13-1 to 13-4 of the power supply circuit 10 perform the soft switching operation. However, as described above, as the coupling degree between the transmission coil 14 and the reception coil 21 increases or the resistance value Ro of the load circuit 26 decreases, a delay in the phase of the current flowing through the transmission coil 14 from the phase of the voltage applied to the switching elements 13-1 to 13-4 is reduced. Therefore, if the phase adjustment circuit 16 keeps turned on, the phase of the current flowing through the transmission coil 14 advances more than the phase of the voltage applied to the switching elements 13-1 to 13-4, and the switching elements 13-1 to 13-4 may not be able to continue the soft switching operation.

Therefore, the control circuit 18 controls the power supply circuit 10 and the phase adjustment circuit 16 as follows.

In a standby state, the control circuit 18 compares a measured value of the amount of current detected by the current detection circuit 17 with a first threshold value Ith1 at the timing toff when any of the pairs of switching elements (for example, switching elements 13-1 and 13-4) simultaneously turned on among the switching elements 13-1 to 13-4 is turned off. Note that the first threshold value Ith1 can be, for example, 0 or a value obtained by adding a predetermined offset to 0. The standby state represents a state in which power is not supplied from the power transmission device 2 to the power reception device 3 and the phase adjustment circuit 16 is turned on. Then, when the coupling degree between the transmission coil 14 and the reception coil 21 increases and the measured value of the amount of current becomes equal to or less than the threshold value Ith1, the control circuit 18 controls the switching element S of the phase adjustment circuit 16 to be turned off and turns off the phase adjustment circuit 16. Therefore, the LC series circuit is disconnected from the power supply circuit 10, and the power transmission device 2 shifts from the standby state to a supply operation state. The supply operation state represents a state in which power is supplied from the power transmission device 2 to the power reception device 3 and the phase adjustment circuit 16 is turned off. Thus, the switching elements 13-1 to 13-4 can continue the soft switching operation. Further, when the coupling degree between the transmission coil 14 and the reception coil 21 increases, the delay amount of the phase of the current flowing through the transmission coil 14 from the phase of the voltage applied to the switching elements 13-1 to 13-4 is reduced. Therefore, even when the phase adjustment circuit 16 is turned off, the peak value of the current at the timing toff when each switching element is turned off also decreases. Furthermore, the control circuit 18 turns on the relay RL of the power supply circuit 10 such that power is supplied from the power source 11 to each of the switching elements 13-1 to 13-4 without passing through the DC/DC converter 12. This increases an amount of power that can be transmitted per unit time and improves power transmission efficiency.

On the other hand, in the supply operation state, the control circuit 18 compares the measured value of the amount of current detected by the current detection circuit 17 with a second threshold value Ith2 at the timing toff when any of the pairs of switching elements simultaneously turned on among the switching elements 13-1 to 13-4 is turned off. The second threshold value Ith2 is set to a value higher than the first threshold value Ith1. Then, when the measured value of the amount of current becomes higher than the threshold value Ith2, the control circuit 18 controls the switching element S of the phase adjustment circuit 16 to be turned on and turns on the phase adjustment circuit 16. Thus, the power transmission device 2 shifts from the supply operation state to the standby state. In the standby state, as described above, the current flowing through the phase adjustment circuit 16 and the current flowing through the transmission coil 14 cancel each other, and as a result, the peak value of the current flowing through each of the switching elements 13-1 to 13-4 at the turn-off timing toff decreases. Therefore, the switching loss in each of the switching elements 13-1 to 13-4 is reduced. Further, the control circuit 18 turns off the relay RL of the power supply circuit 10 such that power from the power source 11 is supplied to each of the switching elements 13-1 to 13-4 via the DC/DC converter 12. As a result, the voltage applied to each of the switching elements 13-1 to 13-4 decreases while the power supply from the power transmission device 2 to the power reception device 3 is stopped, and thus the conduction loss in each of the switching elements 13-1 to 13-4 is reduced.

Figure 4:
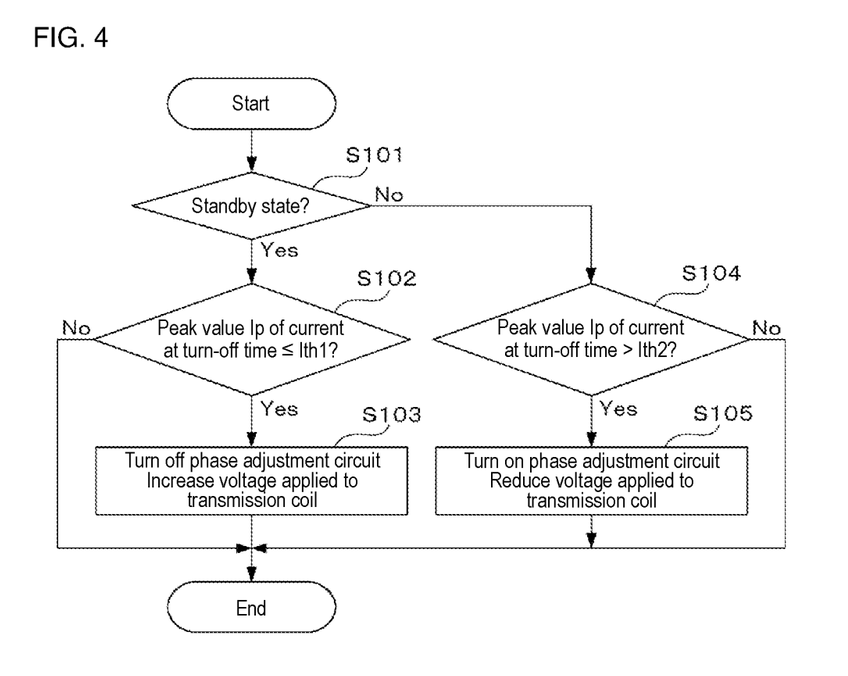
FIG. 4 is a control flow diagram illustrating the power supply circuit and a phase adjustment circuit by a control circuit of a power transmission device.

FIG. 4 is a control flowchart of the power supply circuit 10 and the phase adjustment circuit 16 by the control circuit 18 according to the embodiment. The control circuit 18 only has to control the power supply circuit 10 and the phase adjustment circuit 16 in accordance with the control flowchart at a predetermined cycle.

The control circuit 18 determines whether the power transmission device 2 is in the standby state, that is, whether the phase adjustment circuit 16 is turned on (step S101). For example, the control circuit 18 only has to determine whether the power transmission device 2 is in the standby state with reference to a flag indicating whether the power transmission device 2 is in the standby state, the flag being stored in a memory circuit included in the control circuit 18.

When the power transmission device 2 is in the standby state (Yes in step S101), the control circuit 18 determines whether the peak value of the current flowing through each switching element at the turn-off timing of each switching element of the power supply circuit 10 is equal to or less than the first threshold value Ith1 (step S102). When the peak value of the current flowing through each switching element at the turn-off timing is higher than the first threshold value Ith1 (No in step S102), it is assumed that the power reception device 3 is away from the power transmission device 2 so as not to be able to transmit power, or that the current flowing through the load circuit 26 of the power reception device 3 is significantly small. Therefore, the control circuit 18 maintains the standby state.

On the other hand, when the peak value of the current flowing through each switching element at the turn-off timing is equal to or less than the first threshold value Ith1 (Yes in step S102), it is assumed that the power reception device 3 is so close to the power transmission device 2 that the power transmission is possible. Therefore, the control circuit 18 turns off the phase adjustment circuit 16 and increases the voltage of the AC power applied to the transmission coil 14 (step S103). That is, the control circuit 18 turns off the switching element of the phase adjustment circuit 16 and disconnects the LC series circuit included in the phase adjustment circuit 16 from the power supply circuit 10. Further, the control circuit 18 turns on the relay RL of the power supply circuit 10 such that power is supplied from the power source 11 to each switching element without passing through the DC/DC converter 12. Further, the control circuit 18 rewrites a value of the flag to a value indicating the supply operation state.

On the other hand, when the power transmission device 2 is not in the standby state in step S101, that is, when the power transmission device 2 is in the supply operation state (No in step S101), the control circuit 18 determines whether the peak value of the current flowing through each switching element at the turn-off timing of each switching element of the power supply circuit 10 is higher than the second threshold value Ith2 (step S104). When the peak value of the current flowing through each switching element at the turn-off timing is equal to or less than the second threshold value Ith2 (No in step S104), it is assumed that sufficient power is transmitted from the power transmission device 2 to the power reception device 3. Therefore, the control circuit 18 maintains the supply operation state.

On the other hand, when the peak value of the current flowing through each switching element at the turn-off timing is higher than the second threshold value Ith2 (Yes in step S104), it is assumed that the power reception device 3 is away from the power transmission device 2 so as not to be able to transmit power or the current flowing through the load circuit 26 of the power reception device 3 is significantly small. Therefore, the control circuit 18 turns on the phase adjustment circuit 16 and reduces the voltage of the AC power applied to the transmission coil 14 (step S105). That is, the control circuit 18 turns on the switching element of the phase adjustment circuit 16 and connects the LC series circuit included in the phase adjustment circuit 16 to the power supply circuit 10. Further, the control circuit 18 turns off the relay RL of the power supply circuit 10 such that power is supplied from the power source 11 to each switching element via the DC/DC converter 12. Further, the control circuit 18 rewrites the value of the flag to a value indicating the standby state.

As described above, the non-contact power supply device has the phase adjustment circuit connected in parallel with the transmission coil of the power transmission device and including the LC series circuit. Then, the non-contact power supply device appropriately controls the delay amount of the phase of the current flowing through each switching element from the phase of the voltage applied to each switching element by switching on and off the phase adjustment circuit in accordance with the current flowing through each switching element at the timing when each switching element of the power supply circuit that supplies the AC power to the transmission coil is turned off. As a result, the non-contact power supply device reduces the switching loss of each switching element of the power supply circuit when power is not supplied from the power transmission device to the power reception device. Furthermore, the non-contact power supply device reduces the conduction loss by reducing the voltage applied to each switching element of the transmission coil and the power supply circuit when the phase adjustment circuit is turned on, that is, in the standby state. Furthermore, the non-contact power supply device does not use resonance on the power transmission side for power transmission, and thus energy consumption in the standby state can be suppressed. As described above, the non-contact power supply device can reduce the switching loss and the conduction loss when the power supply from the power transmission device to the power reception device is stopped only by the control in the power supply device, and thus the energy consumption when the power transmission is stopped can be suppressed by simple control.

Thus, the non-contact power supply device is suitably used as a facility for supplying power to a moving object such as a vehicle. For example, as disclosed in Non-Patent Document 1, the power reception device 3 may be placed on a moving object, and the power transmission device 2 may be installed on a route on which the moving object travels. In this case, when the moving object on which the power reception device 3 is placed is close to the power transmission device 2 and the measured value of the current of each switching element at the timing when each switching element of the power supply circuit 10 is turned off by the current detection circuit 17 of the power transmission device 2 becomes equal to or less than the threshold value Ith1, the control circuit 18 only has to turn on the phase adjustment circuit 16 and increase the voltage applied to the transmission coil 14. Then, when the moving object on which the power reception device 3 is placed is away from the power transmission device 2 and the measured value of the current of each switching element at the timing when each switching element of the power supply circuit 10 is turned off becomes equal to or less than the threshold value Ith2, the control circuit 18 only has to turn off the phase adjustment circuit 16 and lower the voltage applied to the transmission coil 14. Thus, the non-contact power supply device can supply power to the moving object that is moving, and can suppress the energy consumption in the standby state.

In a modification, the power supply circuit of the power transmission device 2 may have a half bridge circuit in which a plurality of switching elements is connected in a half bridge shape instead of the full bridge circuit. The power supply circuit may convert DC power outputted from the DC power source into AC power using the half bridge circuit. Also in this case, it is sufficient that the current detection circuit 17 of the power transmission device 2 is provided so as to be able to measure the current flowing through each switching element of the half bridge circuit. Similarly to the above embodiment, the control circuit 18 of the power transmission device 2 only has to switch on and off the phase adjustment circuit 16 on the basis of the measured value of the current measured by the current detection circuit 17 when any one of the switching elements of the half bridge circuit is turned off in accordance with the flowchart illustrated in FIG. 4.

In another modification, the power supply circuit of the power transmission device 2 may have a power factor correction circuit instead of the DC/DC converter and the relay RL. In this case, the control circuit 18 of the power transmission device 2 only has to control the power factor correction circuit such that a boosting ratio of the power supplied from the power source 11 to the voltage by the power factor correction circuit while the phase adjustment circuit 16 is turned on is lower than a boosting ratio while the phase adjustment circuit 16 is turned off.

In the embodiment or the modifications, one end of the phase adjustment circuit connected to a side of the capacitor 15 of the LC series circuit may be connected between the capacitor 15 and the transmission coil 14.

Further, in the embodiment or the modifications, the reception coil and the resonance capacitor may be connected in parallel in the resonance circuit of the power reception device. Furthermore, a coil connected in series with the reception coil may be provided between the reception coil and the rectifying and smoothing circuit.

In this way, those skilled in the art can make various modifications in accordance with the embodiment within the scope of the invention.

DESCRIPTION OF SYMBOLS

1 non-contact power supply device
2 power transmission device
10 power supply circuit
11 power source
12 DC/DC converter
13-1~13-4 switching element
14 transmission coil
15 capacitor
16 phase adjustment circuit
17 current detection circuit
18 control circuit
3 power reception device
20 resonance circuit
21 reception coil
22 resonance capacitor
23 rectifying and smoothing circuit
24 full-wave rectifier circuit
25 smoothing capacitor
26 load circuit

The invention claimed is:

1. A non-contact power supply device comprising:
a power transmission device; and
a power reception device to which power is transmitted from the power transmission device in a non-contact manner,
wherein the power transmission device comprises
a transmission coil configured to supply power to the power reception device,
a power supply circuit comprising a plurality of switching elements connected in a full bridge shape or a half bridge shape between a DC power source and the transmission coil, and configured to convert DC power supplied from the DC power source into AC power having a switching frequency by switching on and off the plurality of switching elements at the switching frequency and supply the AC power to the transmission coil,
a phase adjustment circuit comprising an LC series circuit connected in parallel with the transmission coil and a switching element connected in series with the LC series circuit,
a current detection circuit configured to obtain a measured value of an amount of current flowing through the plurality of switching elements of the power supply circuit, and
a control circuit configured to control switching on and off of the switching element of the phase adjustment circuit in accordance with a measured value of the amount of current in response to any of the plurality of switching elements of the power supply circuit being turned off, wherein
the control circuit turns off the switching element of the phase adjustment circuit in response to: the switching element of the phase adjustment circuit being turned on; and the measured value of the amount of current becoming equal to or less than a first threshold value, and
the control circuit turns on the switching element of the phase adjustment circuit in response to: the switching element of the phase adjustment circuit being turned off; and the measured value of the amount of current becoming higher than a second threshold value that is larger than the first threshold value.

2. The non-contact power supply device according to claim 1, wherein
the power supply circuit is configured to adjust a voltage applied to the plurality of switching elements,
the control circuit controls the power supply circuit such that the voltage applied to the plurality of switching elements increases in response to the measured value of the amount of current becoming equal to or less than the first threshold value and the switching element of the phase adjustment circuit being turned on, and
the control circuit controls the power supply circuit such that the voltage applied to the plurality of switching elements decreases in response to the measured value of the amount of current becoming higher than the second threshold value and the switching element of the phase adjustment circuit being turned off.

3. A power transmission device that transmits power to a power reception device in a non-contact manner, the power transmission device comprising:
a transmission coil configured to supply power to the power reception device;
a power supply circuit comprising a plurality of switching elements connected in a full bridge shape or a half bridge shape between a DC power source and the transmission coil, and configured to convert DC power supplied from the DC power source into AC power having a switching frequency by switching on and off the plurality of switching elements at the switching frequency and supply the AC power to the transmission coil;
a phase adjustment circuit comprising an LC series circuit connected in parallel with the transmission coil and a switching element connected in series with the LC series circuit;

a current detection circuit configured to obtain a measured value of an amount of current flowing through the plurality of switching elements of the power supply circuit; and a control circuit configured to control switching on and off of the switching element of the phase adjustment circuit in accordance with a measured value of the amount of current in response to any of the plurality of switching elements of the power supply circuit being turned off, wherein the control circuit turns off the switching element of the phase adjustment circuit in response to: the switching element of the phase adjustment circuit being in an on state; and the measured value of the amount of current becoming equal to or less than a first threshold value, and the control circuit turns on the switching element of the phase adjustment circuit in response to: the switching element of the phase adjustment circuit being in an off state; and the measured value of the amount of current becoming higher than a second threshold value that is larger than the first threshold value.

\* \* \* \* \*